May 16, 1950     W. G. FRENZEL     2,507,968
TRACTION CLEAT
Filed Feb. 9, 1948
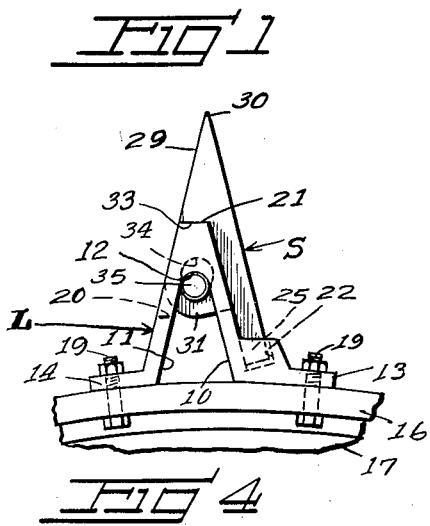
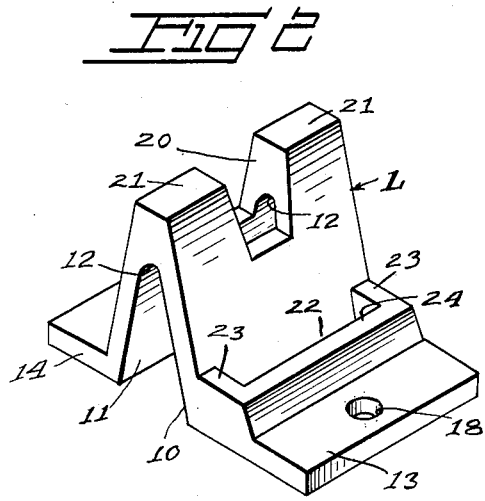
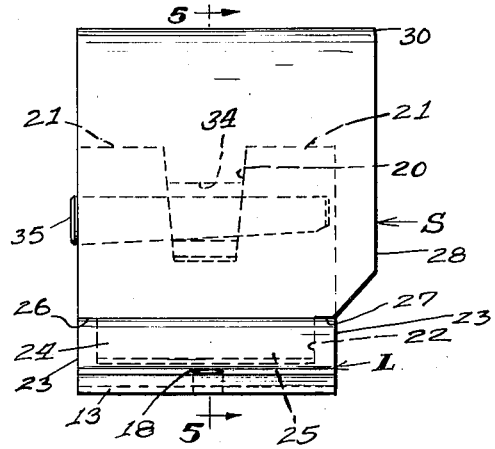
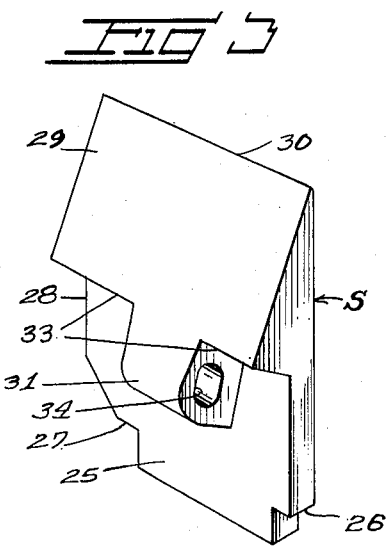
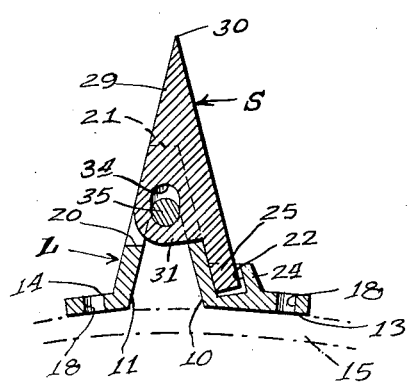
INVENTOR.
*Wilber G. Frenzel*
BY
*Wilfred Lawson*
ATTORNEY Patented May 16, 1950

2,507,968

UNITED STATES PATENT OFFICE 2,507,968

TRACTION CLEAT

Wilbur George Frenzel, Nome, Tex.

Application February 9, 1948, Serial No. 7,180

1 Claim. (Cl. 301—44)

My invention relates to traction cleats generally, and more particularly to lugs for tractor wheels.

The main object of my invention is to provide a tractor lug adapted to be equipped with an easily and readily removable ground engaging part of substantially spade-like form to facilitate the penetration of the cleat into the ground.

Another object of my invention is to provide a tractor cleat of this character which is comprised in a base part adapted to be removably secured to the tread of a tractor or the like and to have a spade-like part detachably supported thereon.

Other objects of my invention not specifically mentioned may appear in the following specification describing my invention with reference to the accompanying drawing illustrating a preferred embodiment of my invention. It is, however, to be understood that my invention is not to be limited and restricted to the exact construction and combination of parts described in the specification and shown in the drawing, but that such changes and modifications may be made which fall within the scope of the claim appended hereto.

In the several figures of the drawing similar parts are indicated by similar reference character and Figure 1 is a view in side elevation of a cleat constructed in accordance with an embodiment of the invention and in applied position;

Figure 2 is a view in perspective of the cleat unapplied with the spade omitted;

Figure 3 is a view in perspective of the spade per se;

Figure 4 is a view in front elevation of the device as shown in Figure 1;

Figure 5 is a sectional view on the line 5—5 of Figure 4; and

Figure 6 is a side view of a wedge pin for securing the spade-like part in position on the base part.

The tractor cleat forming the subject matter of my invention comprises a base, generally indicated at L, having a substantially frusto pyramidical main portion or body formed by a forward and a rearward wall 10 and 11 respectively, which incline upwardly toward each other. The lower edge of each of the two walls 10 and 11, is outturned to provide mounting flanges 13 and 14 respectively for securement on the surface of a caterpillar plate 15 as shown in Figure 5 or onto the rim 16 of a tractor wheel 17 as indicated in Figure 1. Each flange 13, 14 is provided with a hole 18 to receive a bolt 19 therethrough to secure the base in place on the tractor tread. A tapering cut out 20 is removed centrally from the upper surface of the connected portion of the walls 10 and 11 to a depth that extends below the upper side of the space formed between the walls. This cut out 20 forms a recess having two oppositely disposed flat surfaces 21 for a purpose to be described later. On the flange 13 of the front wall 10, a socket 22 is formed by two side walls 23 extending a distance forwardly from the front wall 10 and upwardly from the front flange 13 and a front wall 24 connecting the front ends of the side walls 23. This front wall extends upwardly from the flange 13 in parallel relation to the wall 10.

The above described base L is thus constructed to have a spade-like part S removably but securely mounted thereon, which has a flat lower portion 25 to overlie the front wall 10 and its lower edge engaged in the socket 22 on the flange 13; the opposite ends of the lower edge having angular cutouts to provide shoulders 26 and 27, which seat over the socket end walls 23. From the outer end of the top face of the shoulder 27, the vertical end edge 28, of the lower portion 25 of the spade S, is cut away at an angle of approximately 45 degrees, so that the edge 28 is located approximately one inch beyond the adjacent end of the cleat L, or, in other words, the portion of the spade above the horizontal plane passing through the upper end of the angular cut is approximately one inch longer than the length of the lower shouldered portion of the wall 25. The upper portion of the spade S, above the top of the wall portion 25, is substantially triangular in cross section, so that a relatively sharp edge 30 is formed at its top. A lug 31 is formed at the center of the lower side of the upper portion of the spade S and is shaped to fit into the cutout or recess 20 in the top of the cleat L, with its lower end depending into the space between the walls 10 and 11 of the latter, when the spade is seated on the cleat. The surfaces of the under side of the upper spade portion, constituting shoulders 33 at the opposite sides of the lug 31, rest upon the flat top surfaces of the cleat L, at opposite sides of the recess or cutout 20. A tapered bore 34 is formed through the lug 31 to receive a similarly tapered locking pin 35, which is inserted inwardly from an end of the space between the walls 10 and 11 of the cleat L and into wedging engagement with the bore 24, to secure the spade S rigidly in place. Preferably, the larger outer end of the pin 34 made cylindrical and the remainder of the length of the pin oval in cross section, with the greater diameter disposed vertically, as is also that of the bore 34, the upper side of the pin being substantially parallel to its axis and the lower side sloping upwardly from the outer cylindrical end to the inner smaller oval end 36, the latter end having an angular cut away portion 37 to facilitate the entry of this end of the pin into the bore 34. With spade part S seated on the cleat L, the locking pin 35 is driven into engagement with the bore 34 of the lug 31, so that the lower sloping side thereof exerts a downward pressure on the lug to effectively retain the parts together. When the spade becomes dull, it can be removed for sharpening, or for replacement, by driving the pin 35 free from the lug 31.

I claim:

A traction cleat comprising an elongated base part formed of oppositely inclined walls connected together at their top ends, the connecting portion of said walls having a flat top divided by a downwardly tapering recess which opens through its opposite sides and into the space between the walls below the connecting portion, apertured flanges out-turned from the lower edge portions of said walls for the bolting of the same on the tread of a tractor, a socket formed on one of said flanges parallel to the adjacent one of said walls, a spade of triangular form in cross section and of a length somewhat greater than that of said base adapted to be seated on the base, said spade having the lower portion of one of its sides cut away to form undercut shoulders and a side face to lie against the said adjacent one of said walls of the base, the lower edge of said lower portion being engaged in said socket, a lug depending centrally between said shoulders and seated in said recess with its lower portion projecting downwardly within the space between the walls of said base, the shoulders at opposite sides of said lug seating on the said flat top of the connecting portion of said walls at opposite sides of said recess, said lug having a bore extending through the depending portion of the same, and a tapered pin adapted to be inserted inwardly of an end of the space between the walls of said base and driven into the bore of said lug to secure the base and spade rigidly together.

WILBUR GEORGE FRENZEL.

REFERENCES CITED

The following references are of record in the file of this patent:

UNITED STATES PATENTS

| Number | Name | Date |
| --- | --- | --- |
| 1,304,375 | Robinet | May 20, 1919 |
| 1,417,020 | Bass | May 23, 1922 |
| 1,892,945 | Griebat | Jan. 3, 1933 |